(No Model.) 3 Sheets—Sheet 1.
H. M. OLIVER.
RUNNING GEAR FOR VEHICLES.
No. 416,853. Patented Dec. 10, 1889.
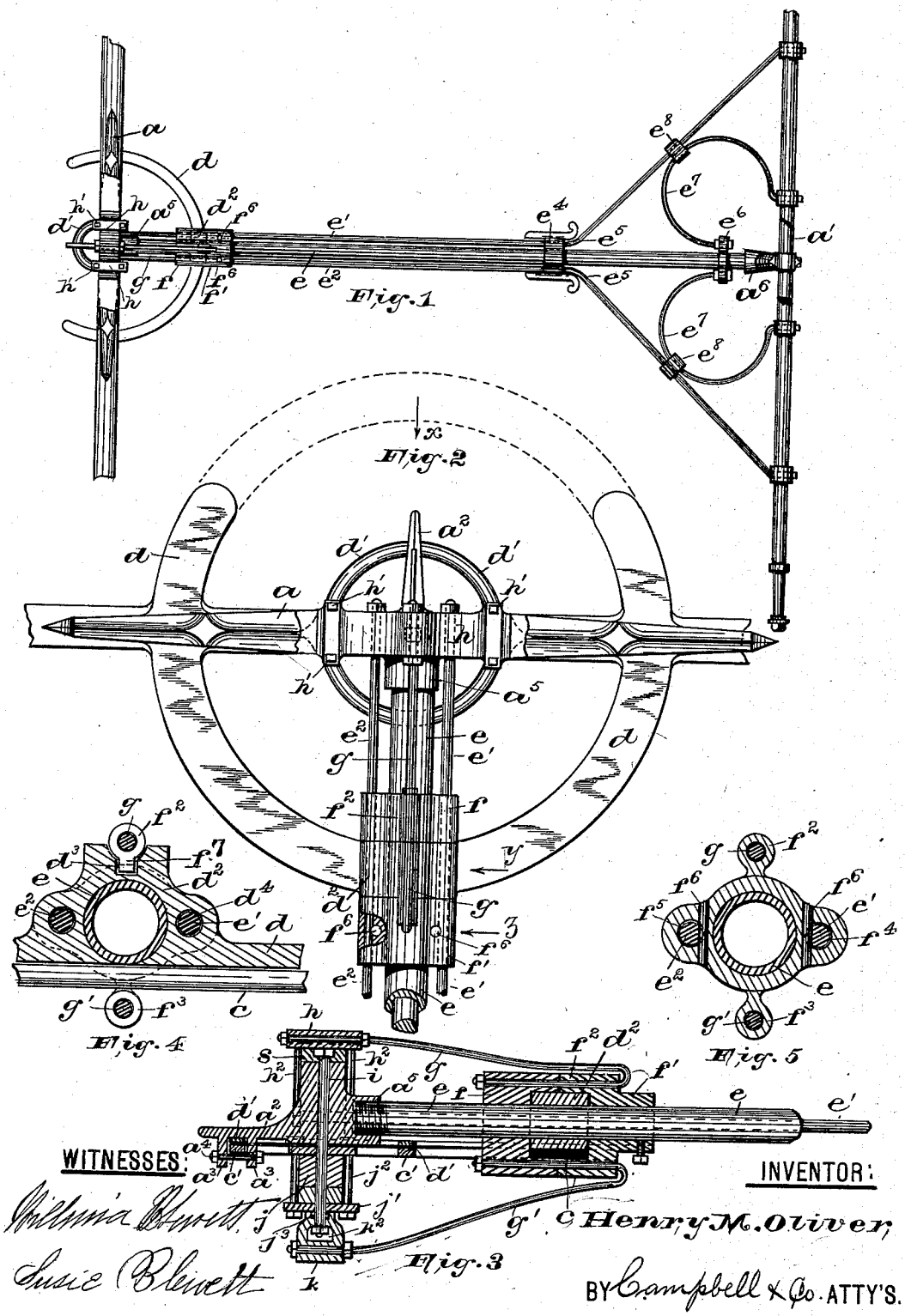

(No Model.) 3 Sheets—Sheet 2.

H. M. OLIVER.
RUNNING GEAR FOR VEHICLES.

No. 416,853. Patented Dec. 10, 1889.

WITNESSES:
William Blewett
Susie Blewett

INVENTOR:
Henry M. Oliver.
BY Campbell & Co. ATT'YS.

N. PETERS, Photo-Lithographer, Washington, D. C.

(No Model.) 3 Sheets—Sheet 3.

H. M. OLIVER.
RUNNING GEAR FOR VEHICLES.

No. 416,853. Patented Dec. 10, 1889.

WITNESSES:
Mary Zeh Trusdell
John G. Trusdell

INVENTOR:
Henry M. Oliver,
BY Campbell & Co ATTY'S.

UNITED STATES PATENT OFFICE.

HENRY M. OLIVER, OF NEWARK, NEW JERSEY, ASSIGNOR TO THE OLIVER MANUFACTURING COMPANY, OF SAME PLACE.

RUNNING-GEAR FOR VEHICLES.

SPECIFICATION forming part of Letters Patent No. 416,853, dated December 10, 1889.

Application filed April 13, 1889. Serial No. 307,169. (No model.)

*To all whom it may concern:*

Be it known that I, HENRY M. OLIVER, a citizen of the United States, residing at Newark, in the county of Essex and State of New Jersey, have invented certain new and useful Improvements in Running-Gear for Vehicles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in running-gears for vehicles; and the object of the inventiion is to produce a running-gear which is simple in construction and by which great security of the parts is attained.

The invention is further designed to provide a simple means of securing the lower fifth-wheel to the axle and the upper wheel.

The nature of my invention consists of constructions and combinations, as will be hereinafter described and claimed, reference being had to the accompanying sheets of drawings, in which similar letters of reference indicate corresponding parts in each of the views.

Figure 6:
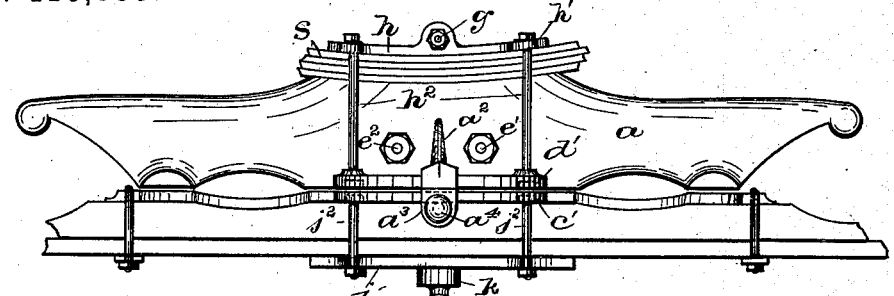
Figure 7:
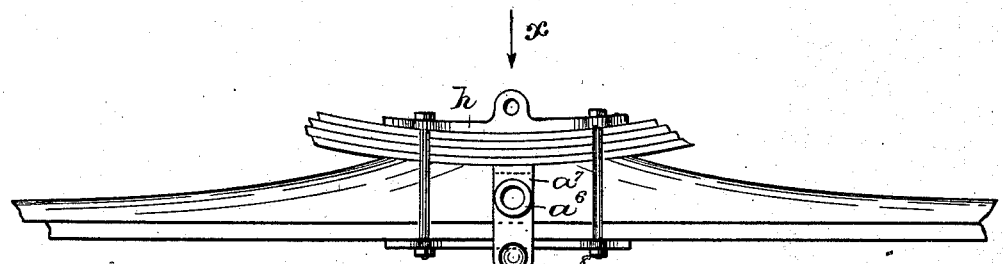
Figure 8:
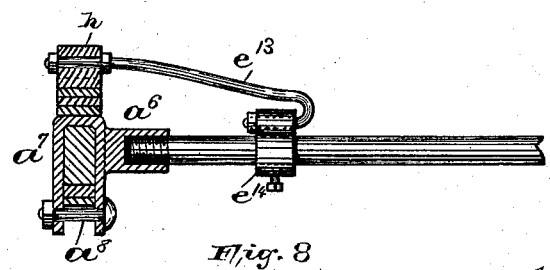
Figure 9:
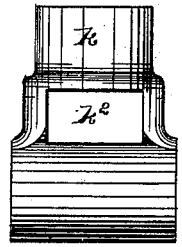
Figure 10:
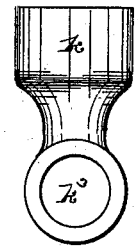
Figure 11:
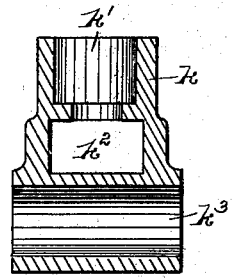
Figure 12:
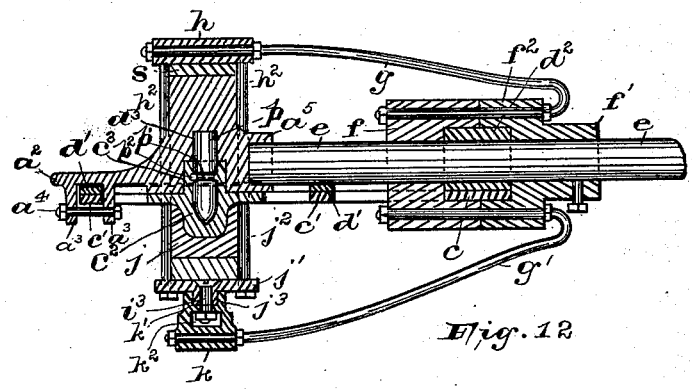
Figure 13:
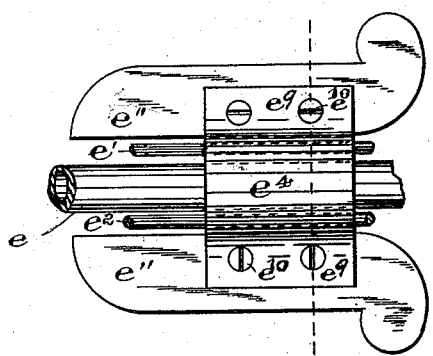
Figure 14:
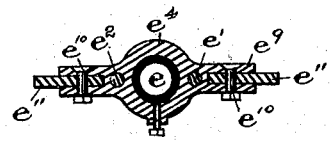
Figure 15:

In said views, Figure 1 illustrates a top view of my invention. Fig. 2 is an enlarged plan or top view of the parts of the running-gear arranged on the front axle. Fig. 3 is a sectional view of Fig. 2, taken through line $x$ in said figure and transversely and centrally through the head-block and the front axle-bed. Figs. 4 and 5 are sections taken through lines $y$ and $z$, respectively, in Fig. 2. On Sheet 2 Fig. 6 is a front elevation of the front axle and head-block, &c., and Fig. 7 is a similar view of the parts arranged on the rear or hind axle. Fig. 8 is a sectional view taken transversely and centrally through the axle-bed and rear axle on the line $x$, Fig. 7. Figs. 9, 10, and 11 are detail views of a fastening device attached underneath the front axle, and to which the lower brace is secured. On Sheet 3 Fig. 12 is a section similar to that shown in Fig. 3, but illustrating a form of construction in which the upper and lower fifth-wheels are provided with pin-receiving sockets and a pivotal pin therein. Fig. 13 is an enlarged view of the wear-irons arranged on the reach-iron; and Fig. 14 is a cross-section through line $x$, Fig. 13. Fig. 15 represents still another method of securing the reach-irons to the rear axle.

Referring to the letters upon the drawings, $a$ and $a'$ represent the head-block on the front axle and the rear axle-bed, respectively, upon which rest the springs which support the body of the vehicle.

$b$ indicates the front axle, and $b'$ the rear axle.

The fifth-wheel proper consists of the lower portions $c$ $c'$ and the upper portions $d$ $d'$, which rest and turn one upon the other, and which rotate around a centrally-arranged pin within pin-receiving sockets therein or around a king-bolt in the ordinary manner.

As illustrated in the drawings, the upper portion of the fifth-wheel consists of a circular portion $d$, secured to the head-block $a$ in any desirable manner or cast integrally thereon, said portion $d$ being provided with a raised portion or shoulder $d^2$, provided with a perforation, and through which passes the reach $e$, as is shown in Figs. 3 and 12.

As shown, the head-block $a$ and the portion $d$ of the fifth-wheel are cast in one piece, the head-block having a projecting arm $a^2$, provided with downwardly-projecting lugs $a^3$ $a^3$, between which pass the smaller or central upper and lower fifth-wheels $d'$ and $c'$, which are concentrically arranged within the larger portions $d$ and $c$ of the fifth-wheel, and the upper one of which is arranged on the head-block $a$, as shown, and thereby helps to strengthen the several parts of the fifth-wheel.

As will be seen from Fig. 3, the portions $d'$ and $c'$ are secured within the lugs $a^3$ by means of a bolt $a^4$. The reach $e$ may be provided on the ends thereof with screw-threads, by means of which the reach is secured within sockets $a^5$ and $a^6$, as illustrated in Figs. 1 and 8, or a bar $e^{12}$ may be forged on the rear end of the reach and flattened and secured underneath the rear axle by means of a clip, as will be readily understood from Fig. 15. On both sides of the projection or shoulder $d^2$ and entirely surrounding the same and a part of the lower portion $c$ of the fifth-wheel are arranged collars or sleeves $f$ and $f'$, through which the reach-rod $e$ passes, and which are provided above and below in a line with the rod $e$ with sleeves $f^2$ and $f^3$, substantially as shown, having perforations therein through which extend the strengthening bolts or braces $g$ and $g'$, the top one $g$ of which extends up and passes through a perforation in a plate $h$, to which it is secured, said plate resting on the top plate of the spring $s$, as shown in Fig. 12, and which plate also serves to keep the king-bolt in place, as shown in Fig. 3. The plate $h$ is provided with receiving-flanges $h'$, through which pass the bolts $h^2$, which hold the portion $d'$ and its head-block $a$ and the plate $h$ together. As has been stated, the sleeves $f^2$ and $f^3$ extend over and underneath the portion $d^2$ on the portion $d$ of the fifth-wheel, and, as is shown more clearly in Fig. 4, the sleeve $f^2$ is provided with a tongue or flange $f^7$, which extends down into a slot or groove $d^3$ in the shoulder $d^2$, and thereby prevents any side movement of said parts. The portion or shoulder $d^2$ is provided on the sides thereof to the right and left of the central opening for the reception of the reach $e$ with perforations $d^4$, corresponding with perforations $f^4$ in the sleeves $f$ and $f'$, arranged on opposite sides of said sleeves, and through which pass the reach-braces $e'$ and $e^2$, which are secured to the front head-block and to the rear axle in any well-known manner. As illustrated in Fig. 1, said reach-braces $e'$ and $e^2$ are arranged on both sides of the reach $e$ and parallel therewith, and a sleeve or collar $e^4$ is arranged in any desirable position on the reach-rod $e$ and is provided with wear-irons $e^{11}$ on both sides thereof, against which the front wheels of the vehicle strike when turning in a small curve. Said wear-irons may be cast integrally on said collar, as in Fig. 1, or the collar may be provided with recessed portions $e^9$ on opposite sides thereof, into which the wear-irons are fitted and secured by means of screws or bolts $e^{10}$, as illustrated in Figs. 13 and 14.

The reach-braces, as is evident from Fig. 1, pass through the collar $e^4$ and are bent at $e^5$ and secured to the rear axle and axle-bed by means of clips. A second collar $e^6$ may be arranged on the rod $e$ near the hind axle, and circular braces $e^7$ pass therethrough, which are secured to the braces $e'$ and $e^2$ by means of the collars $e^8$ and to the hind axle by means of clips. Any well-known means may be employed for securing the collars to the reach or the reach-braces, one construction of fastening the same being illustrated in Fig. 5, in which pins $f^6$ are used, which are secured within the sleeve and pass through the reach-braces, as represented in said figure.

From Figs. 3 and 12 it will be seen that the portion $c$ of the fifth-wheel is arranged on the axle-bed $j$ and is secured thereto by means of the plate $j'$, arranged underneath the axle, and the whole being fastened together by bolts $j^2$. The plate $j'$ is provided on the under side thereof with a perforated and a circular flange $j^3$, which fits into a recess $k'$ in the collar $k$, and through which passes the king-bolt $i$, which extends down into the square opening $k^2$ in said fastening device, and in which opening the nut is secured to the king-bolt. Below the opening $k^2$ and in line with the direction of the lower strengthening bolt or brace $g'$ is a perforation $k^3$, through which said bolt passes and in which the same is secured. The great advantage of this fastening device is that the king-bolt may be inserted through the head-block and axle before the spring $s$ is in place and screwed into its nut, which has previously been placed in position in the opening $k^2$, and after being screwed up and the spring has been arranged on the head-block, as represented in Fig. 1, there is no danger of the nut coming loose from its bolt and lost.

When it is desirable to use the construction shown in Fig. 12, in which the portion $d$ is provided with a centrally-arranged socket $d^3$, corresponding in position with the socket $c^2$ on the portion $c$ of the fifth-wheel, a pivotal pin $p$ is arranged in said sockets and the portion $c$ is provided with an annular projection $c^3$ in the center thereof, which projects up into a corresponding socket in the portion $d$ of the fifth-wheel. In this construction the pivotal pin $p$ takes the place of the king-bolt and the axle is not drilled for the reception of the bolt, and a short bolt $i^3$ is inserted through the plate $j'$, to which the fastening device $k$ is secured, as is clearly shown in Fig. 12.

In lieu of the construction shown in Fig. 1 for securing the reach-bar to the hind axle, the construction illustrated in Fig. 8 may be employed, that shown in Fig. 1 being best adapted for three-spring vehicles, while that shown in Fig. 8 is used where the spring is arranged directly in the middle of the rear axle. In said last-mentioned view I use on the top of the spring a plate $h$, similar to that shown in Figs. 1, 2, and 6, and beneath the spring and around the axle is arranged a clip $a^7$, provided with a reach-rod-receiving socket $a^6$ therein, and fastened to the axle by means of the bolt $a^8$. On the reach-rod is arranged a collar or sleeve $e^{14}$, through which passes the brace-iron $e^{13}$, which is secured to the plate $h$, as shown.

The reach $e$ (shown in the drawings) is represented as a piece of tubing; but, if desirable, the same may be solid or the tube $e$ may have a wooden bar therein, as represented in Fig. 2, or said bar $e$ may be entirely of wood.

Instead of securing the reach-rod to the rear axle, as has been described and shown in Figs. 1 and 8, the rod $e$ may be provided with a flattened bar $e^{12}$, welded to said reach-rod $e$ and passing beneath the axle, to which it may be secured by means of a clip, as indicated in Fig. 15.

By the arrangement and construction of the parts shown and described in the foregoing specification a running-gear is constructed which is much lighter, more durable, and which can be applied to a vehicle with but comparatively little labor.

Having thus described my invention, what I claim is—

1. In a running-gear for vehicles, the combination of the front axle, the fifth-wheel having the upper and lower portions, the socket $a^5$ on the upper portion, the reach having collars $f$ and $f'$, arranged on opposite sides of a raised portion $d^2$ on the portion $d$ of the fifth-wheel, said reach passing through said collars $f$ and $f'$ and the portion $d^2$, as set forth, braces $g$ and $g'$, passing through perforations arranged above and below the reach in the collars $f$ and $f'$, plate $h$ on the spring and head-block, to which said rod $g$ is secured, and a fastening device $k$ underneath the axle, to which the brace $g'$ is secured, for the purposes set forth.

2. In a running-gear for vehicles, the combination, with the front axle, of a fifth-wheel consisting of upper and lower rotating portions having pin-receiving sockets therein, a pivotal pin $p$ in said sockets, a socket $a^5$ on the upper portion, a reach having collars $f$ and $f'$, arranged on opposite sides of a raised portion $d^2$ on the portion $d$ of the fifth-wheel, said reach passing through said collars $f$ and $f'$ and the portion $d^2$, as set forth, braces $g$ and $g'$, passing through perforations above and below the reach in the collars $f$ and $f'$, a plate $h$ on the spring and head-block, to which said rod $g$ is secured, and a fastening device $k$, provided with an opening $k^2$ and a recessed perforation $k'$ above the same to receive a projection $j^3$ on a plate $j'$, and secured to said plate by means of a bolt $i^3$, substantially as set forth, and a perforation $k^3$ in said device, into which extends and is secured the brace $g'$, for the purposes set forth.

3. In a running-gear for vehicles, the combination, with the front axle, of a fifth-wheel having upper and lower rotating portions, the socket $a^5$ on the upper portion, the reach $e$, having collars $f$ and $f'$, arranged on opposite ends of a raised portion $d^2$, as set forth, said reach passing through perforations arranged in a line and centrally in said collars and raised portion, perforations $f^4$ and $f^5$ on the sides of the reach in said collars, perforations $d^4$ in the raised portion $d^2$ on the upper fifth-wheel, said perforations being in line with perforations in the collars, and reach-braces $e'$ and $e^2$ on both sides of the reach $e$, said reach-braces being secured to the front and rear axles and passing and extending through the perforations $f^4$, $f^5$, and $d^4$ in the collars and the raised portion $d^2$, as set forth.

4. In a running-gear for vehicles, the combination of the upper fifth-wheel and the portion $d^2$, collars $f$ and $f'$ on opposite sides of said raised portion and arranged on the reach, reach-braces $e'$ and $e^2$, passing through said collars and the raised portion $d^2$ on both sides of the reach and secured to the head-block on the front axle, a collar $e^4$ on the reach provided with wear-irons on opposite sides thereof, and perforations in said collar $e^4$, through which the reach-braces extend and are bent, as shown, and secured to the rear axle, substantially as and for the purposes set forth.

5. In a running-gear for vehicles, the combination of the upper fifth-wheel and the portion $d^2$, of the reach $e$, extending through said portion $d^2$, collars $f f'$, arranged on the reach, reach-braces $e'$ and $e^2$, passing through said collars and the raised portion $d^2$ on both sides of the reach and secured to the head-block on the front axle, a collar $e^4$ on the reach provided with wear-irons on opposite sides thereof, perforations in said collar $e^4$, through which the reach-braces extend and are bent, as shown, a collar $e^6$ on the reach-braces $e^7$, secured to the braces $e'$ and $e^2$ by means of collars $e^8$, and means for securing the said parts to the rear axle, for the purposes set forth.

6. In a running-gear for vehicles, the combination of the front axle, the fifth-wheel having upper and lower portions, a reach secured thereto and passing through a raised portion $d^2$ on the upper fifth-wheel, as set forth, collars $f$ and $f'$ on opposite ends of said portion arranged on the reach, projections $f^2$ and $f^3$ on said collars which extend above and below the raised portion $d^2$, substantially as indicated, and rods $g$ and $g'$, passing through said projections $f^2$ and $f^3$, the projection $f^2$ being provided with projecting tongue $f^7$, extending down into a slot $d^3$ in the raised portion $d^2$, for the purposes set forth.

7. In a running-gear for vehicles, the combination of the front axle, the fifth-wheel having upper and lower portions, a reach secured thereto and passing through a raised portion $d^2$ on the upper fifth-wheel, as set forth, collars $f$ and $f'$ on opposite ends of said portion arranged on the reach, projections $f^2$ and $f^3$ on said collars which extend above and below the raised portion $d^2$, substantially as indicated, rods or bolts $g$ and $g'$, passing through said projections $f^2$ and $f^3$, the projection $f^2$ being provided with projecting tongues $f^7$, extending down into a slot $d^3$ in the raised portion $d^2$, perforations $f^4$ and $f^5$, in the collars $f$ and $f'$, and perforations $d^4$ in the portion $d^2$, and reach-braces $e'$ and $e^2$, extending therethrough and secured to the front and rear axles, and means for securing said collars to the reach and reach-braces, as and for the purposes set forth.

8. In a fifth-wheel, in combination, the upper and lower rotating portions, a raised portion on the upper rotating portion, collars $f$ and $f'$, surrounding said raised portion, as shown, provided with sleeves $f^2$ and $f^3$, extending over and underneath said raised portion and having perforations therein, a tongue or flange $f^7$ on the upper of said sleeves, and a slot $d^3$ in said raised portion, into which the tongue or flange $f^7$ projects, and braces $g$ and $g'$, secured to said sleeves $f^2$ and $f^3$ and to the axle, for the purposes set forth.

9. In a fifth-wheel, the combination, with the head-block, of the upper and lower fifth-wheels and a smaller and centrally-arranged fifth-wheel therein, the head-block being provided with an arm $a^2$, projecting at a right angle therefrom and in a horizontal plane and having downwardly-projecting arms or lugs $a^3$, between which pass the portions $d'$ and $c'$ of the smaller fifth-wheel, and means arranged below said portion $c'$ and secured to said lugs $a^3$ to prevent the displacement of the portions $d'$ and $c'$ from between said lugs, for the purposes set forth.

10. The combination, with the upper fifth-wheel $d$, having the raised and perforated portion $d^2$ thereon, the reach passing and extending through said raised portion, and means for securing the same to the front and rear axles, reach-braces $e'$ and $e^2$, passing and extending through the raised portion $d^2$ on opposite sides of the reach, wear-irons secured to a collar on the reach, said collar being provided with perforations through which the reach-braces $e'$ and $e^2$ pass and are bent, as shown, and means for securing said reach-braces to the axles of a vehicle, for the purposes set forth.

11. In the herein-described running-gear, the fastening device $k$, provided with a recessed perforation $k'$ in the top thereof extending down into a square opening $k^2$, passing from side to side of the fastening device, and a perforation $k^3$ below said opening $k^2$ and extending from end to end in the bottom of the fastening device, as and for the purposes set forth.

12. The combination, in a running-gear, of the upper and lower rotating portions having pin-receiving sockets therein, a pivotal pin arranged in said sockets, the front axle, a portion $d^2$ on the upper fifth-wheel, collars $f$ and $f'$, and a reach extending through said portion $d^2$ and the collars $f$ and $f'$, means for securing said collars to the reach, and reach-braces arranged on both sides of said reach, and a centrally-arranged fifth-wheel consisting of the upper and lower rotating portions $d'$ and $c'$, all of said parts being arranged substantially as and for the purposes set forth.

13. In a vehicle, the combination of the axles, the fifth-wheel affixed to the front axle, and a head-block cast integrally on said fifth-wheel, a hollow reach, and reach-braces arranged parallel with said reach, or approximately so, and bent substantially as shown, collars or sleeves connecting said reach and reach-braces, one of said collars being provided with wear-irons, for the purpose set forth, and means for securing the reach and reach-braces to the front and rear axles, substantially as set forth.

14. In a running-gear, the combination of the front and rear axles, the head-block and upper fifth-wheel cast in one piece and connected with the lower fifth-wheel, as described, a reach and reach-braces extending through a raised portion $d^2$, cast integrally on the portion $d$ of the upper fifth-wheel, sleeves or collars $f$ and $f'$ on opposite ends of said portion $d^2$, arranged substantially as described, a collar $e^4$ on the reach $e$, provided with recessed flanges $e^9$, wear-irons $e^{11}$ therein, and means for securing said irons within the flanges and said collar to the reach, for the purposes set forth.

15. The combination, with the hollow reach and the reach-braces arranged parallel with said reach, or approximately so, and bent substantially as shown, of a collar encircling said reach and reach-braces and wear-irons removably secured to the opposite sides of said collar, as set forth.

16. In a vehicle, the combination of the axles, the fifth-wheel affixed to the front axle, said wheel consisting of the upper and lower portions $d$ and $c$ and a smaller and centrally-arranged fifth-wheel therein, a head-block cast integrally with the upper portions of said concentrically-arranged fifth-wheels, a hollow reach, and reach-braces arranged parallel with said reach, or approximately so, and bent substantially as shown, and means arranged on said reach and reach-braces for securing the same together and to the axles of the vehicle, for the purposes set forth.

17. The combination, in a running-gear for vehicles, with the hollow reach $e$ and the reach-braces $e'$ and $e^2$, of the upper and lower fifth-wheel portions $d$ and $c$ and a centrally-arranged and smaller fifth-wheel, one of said portions $d$ provided with means for securing said reach and the reach-braces thereto, a collar on said reach, wear-irons secured to said collar, and means for securing the several portions of the concentrically-arranged fifth-wheels together and to the front axle, as set forth.

18. In a fifth-wheel, in combination, the upper rotating portion $d$ thereof, provided with a pin-receiving socket closed at its upper end, the lower rotating portion $c$, having a pin-receiving socket closed at its lower end, a pivotal pin arranged in said sockets, a head-block cast integrally on said upper portion, centrally-arranged smaller portions $d'$ and $c'$, said pin arranged in the pin-receiving sockets, forming a pivot on which said rotating portions $d$ and $c$ and $d'$ and $c'$ turn, and a locking-pin $p^2$, all of said parts being arranged substantially as and for the purposes set forth.

19. In a fifth-wheel, in combination, the upper rotating portion $d$ thereof, provided with a pin-receiving socket closed at its upper end, the lower rotating portion $c$, having a pin-receiving socket closed at its lower end, a pivotal pin arranged in said sockets, a head-block cast integrally on said upper rotating portion $d$, provided with an arm $a^2$ extending therefrom, having downwardly-projecting arms or lugs thereon, a centrally-arranged and smaller fifth-wheel within the portions $d$ and $c$, consisting of the upper and lower portions $d'$ and $c'$, said portions passing between the downwardly-projecting arms or lugs on the arm $a^2$, and means for securing said downwardly-projecting arms together to prevent the displacement of the portions $d'$ and $c'$ from between said arms, substantially as and for the purposes set forth.

20. In a fifth-wheel, in combination, the upper rotating portion $d$, provided with a pin-receiving socket $d^3$, the lower rotating portion $c$, provided with a pin-receiving socket $c^2$, a pivotal pin arranged within said sockets, a raised portion $d^2$ on the rotating portion $d$, collars $f$ and $f'$, surrounding said raised portion $d^2$, substantially as shown, said collars being connected with one another by means of braces $g$ and $g'$, bent and turned up over and below the collars $f$ and $f'$, respectively, and secured to the axle, substantially as and for the purposes set forth.

In testimony that I claim the invention set forth above I have hereunto set my hand this 28th day of March, 1889.

HENRY M. OLIVER.

Witnesses:
FREDK. C. FRAENTZEL,
MARCY ZEH. TRUSDELL.